(12) United States Patent
Caceres et al.

(10) Patent No.: US 10,767,614 B2
(45) Date of Patent: Sep. 8, 2020

(54) FILTER ASSEMBLY FOR FUEL INJECTORS

(71) Applicant: Caterpillar Inc., Deerfield, IL (US)

(72) Inventors: Diego Caceres, Dunlap, IL (US); Thangaraj Ramalingam, Chennai (IN)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 16/173,239

(22) Filed: Oct. 29, 2018

(65) Prior Publication Data

US 2020/0132030 A1    Apr. 30, 2020

(51) Int. Cl.
| | |
|---|---|
| F02M 61/16 | (2006.01) |
| B01D 29/13 | (2006.01) |
| B01D 29/00 | (2006.01) |
| B01D 29/52 | (2006.01) |
| B01D 35/02 | (2006.01) |
| F02M 47/04 | (2006.01) |
| F02M 57/02 | (2006.01) |

(52) U.S. Cl.
CPC ......... F02M 61/165 (2013.01); B01D 29/005 (2013.01); B01D 29/13 (2013.01); B01D 29/52 (2013.01); B01D 35/02 (2013.01); F02M 47/04 (2013.01); F02M 57/025 (2013.01)

(58) Field of Classification Search
CPC ...... B01D 29/005; B01D 29/13; B01D 29/52; B01D 35/02; F02M 47/04; F02M 57/025; F02M 61/165
See application file for complete search history.

(56) References Cited

U.S. PATENT DOCUMENTS

| | | |
|---|---|---|
| 5,560,825 A | 10/1996 | Shafer |
| 8,460,422 B2 | 6/2013 | McClure |
| 2004/0069704 A1 | 4/2004 | Yamaguchi et al. |
| 2005/0178861 A1 | 8/2005 | Sugiyama |
| 2009/0120869 A1 | 5/2009 | Harkema et al. |
| 2018/0078952 A1 | 3/2018 | Russell |

FOREIGN PATENT DOCUMENTS

| | | |
|---|---|---|
| CA | 2839335 A1 | 7/2014 |
| CN | 107694236 A | 2/2018 |
| JP | H11247641 | 9/1999 |
| JP | 2001272196 A | 10/2001 |
| JP | 6221998 | 11/2017 |

*Primary Examiner* — Dirk R Bass

(74) *Attorney, Agent, or Firm* — Law Office of Kurt J. Fugman LLC

(57) ABSTRACT

A filter assembly for filtering hydraulic fluid in a hydraulically actuated fuel injector is disclosed. The filter assembly includes a plurality of first rollers and a plurality of second rollers. The first rollers are parallelly disposed one after the other, and define first axes disposed in a first plane. The second rollers are parallelly disposed one after the other, and define second axes disposed in a second plane. The first plane is parallel to the second plane. Further, each second roller is disposed between a consecutively arranged pair of first rollers to define one or more filtration zones for filtering the hydraulic fluid.

20 Claims, 5 Drawing Sheets

FILTER ASSEMBLY FOR FUEL INJECTORS

TECHNICAL FIELD

The present disclosure relates to unit injectors, such as Hydraulically actuated Electronically controlled Unit Injectors (HEUIs), for use in injecting fuel in internal combustion engines. More particularly, the present disclosure relates to a filter assembly for use with filtering hydraulic fluid in such injectors.

BACKGROUND

Internal combustion engines are known to use Hydraulically actuated Electronically controlled Unit Injectors (HEUI). HEUIs generally use a hydraulic pump and hydraulic fluid to generate fuel injection pressure. As an example, pressure generated in the hydraulic fluid by the hydraulic pump is transferred to an actuating plunger or an intensifier piston of the fuel injector (e.g., in accordance with an engine load condition) to facilitate pressurized fuel injection into one or more cylinders of the engine.

A presence of contaminants, debris, and/or impurities in the hydraulic fluid flow, may erode interior surfaces of the fuel injector, and further affect tolerances and working of injector components, thus potentially shortening injector life. In some cases, debris and impurities may also obstruct or clog the flow of hydraulic fluid, leading to imprecise fuel injection events and unacceptable injector performance.

US Patent No. 20050178861 relates to a fuel injector for supplying fuel into an internal combustion engine. The fuel injector includes a fuel filter disposed at a fuel inlet opening. The fuel filter includes a frame made of resin and a substantially flat filter element supported in the frame. The frame includes a cylindrical portion forcibly inserted into the inner bore of the cylindrical member of the fuel injector.

SUMMARY OF THE INVENTION

In one aspect, the disclosure is directed towards a filter assembly for filtering hydraulic fluid in a hydraulically actuated fuel injector. The filter assembly includes a number of first rollers and a number of second rollers. The first rollers are parallelly disposed one after the other, and define first axes disposed in a first plane. The second rollers are parallelly disposed one after the other, and define second axes disposed in a second plane. The first plane is parallel to the second plane. Further, each second roller is disposed between a consecutively arranged pair of first rollers to define one or more filtration zones for filtering the hydraulic fluid.

Certain aspects of the present disclosure relate to a fuel injector. The fuel injector includes a body with a channel to receive hydraulic fluid for actuating the fuel injector. The fuel injector also includes a filter assembly that is at least partly positioned within the channel to filter the hydraulic fluid. The filter assembly includes a number of first rollers and a number of second rollers. The first rollers are parallelly disposed one after the other, and define first axes disposed in a first plane. The second rollers are parallelly disposed one after the other, and define second axes disposed in a second plane. The first plane is parallel to the second plane. Further, each second roller is disposed between a consecutively arranged pair of first rollers to define one or more filtration zones for filtering the hydraulic fluid.

DETAILED DESCRIPTION

Figure 1:
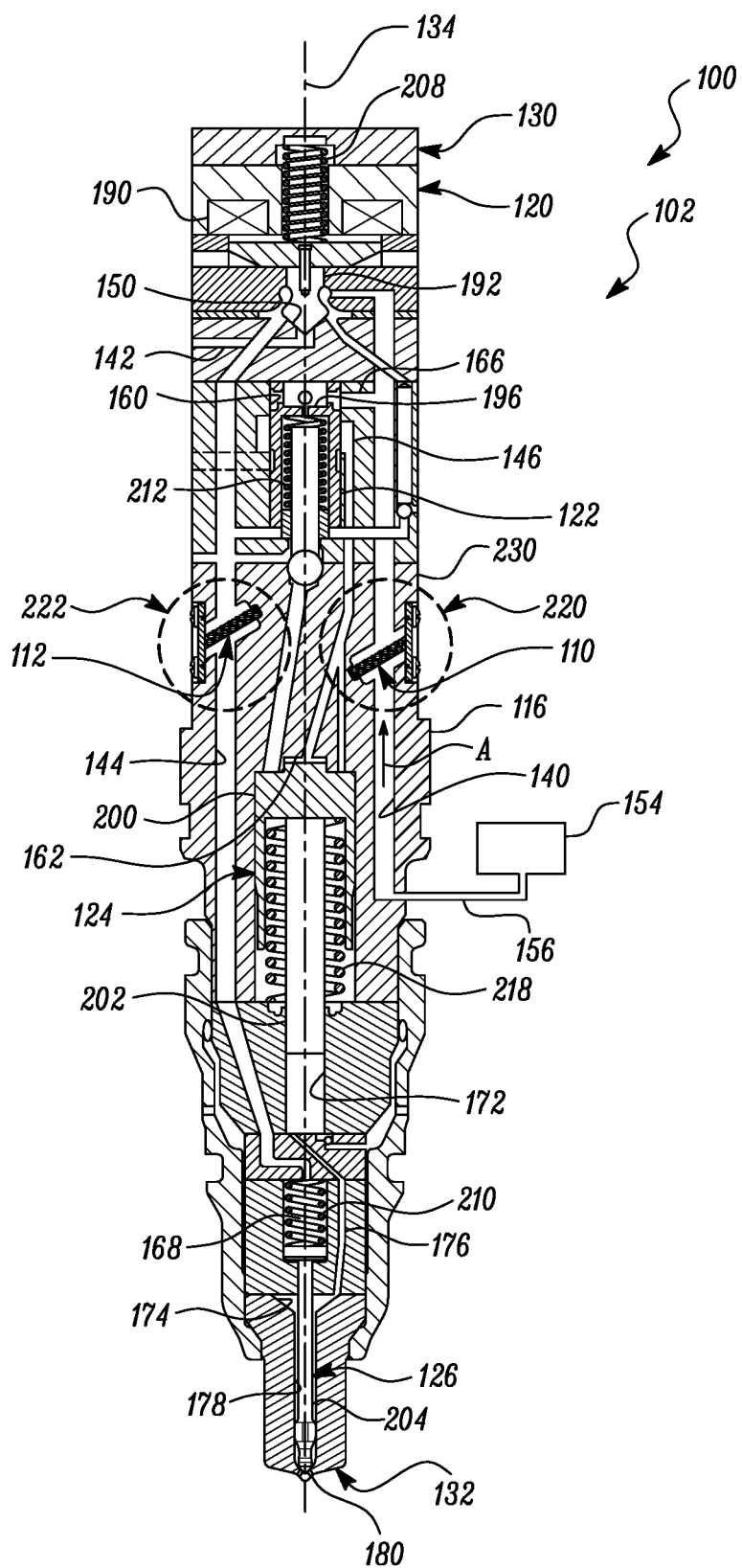
FIG. 1 is an exemplary fuel injector including a filter assembly, in accordance with an embodiment of the present disclosure.

Referring to FIG. 1, a fuel injector 100 is illustrated. The fuel injector 100 may be used to inject fuel such as gasoline, etc., into one or more combustion chambers of an internal combustion engine (not shown), during a combustion process. The fuel injector 100 may be a hydraulically actuated fuel injector 102. For example, the fuel injector 100 may correspond to and/or may include a Hydraulically actuated Electronically controlled Unit Injector (HEUIs). The fuel injector 100 may utilize a hydraulic fluid to actuate the fuel injector 100 for injecting fuel into the combustion chambers. According to an example, the hydraulic fluid utilized for actuation of the fuel injector 100 may include an engine lubricating oil, although other fluids may be applicable. Further, the fuel injector 100 includes a first filter assembly 110 and a second filter assembly 112, with both the first filter assembly 110 and the second filter assembly 112 being configured to filter the hydraulic fluid flowing in the fuel injector 100.

The fuel injector 100 may include an injector body 116 (hereinafter referred to as a body 116), a control valve assembly 120, a spool valve member 122, a piston assembly 124, and a needle valve system 126. Each of the control valve assembly 120, spool valve member 122, piston assembly 124, and needle valve system 126, may work in concert to inject fuel into the combustion chambers. Exemplary discussions related to each of the body 116, the control valve assembly 120, the spool valve member 122, the piston assembly 124, and the needle valve system 126, will be set out below.

The body 116 includes a first end 130, a second end 132 opposite to the first end 130, and a longitudinal axis 134 extending through the first end 130 and the second end 132. According to an orientation of the body 116, as exemplarily depicted in FIG. 1, the first end 130 is disposed at the top, while the second end 132 is disposed at the bottom.

The body 116 may define multiple fluid passages for facilitating hydraulic fluid flow from one portion of the body 116 to another. For example, the body 116 includes a channel 140 (hereinafter referred to as a high-pressure passage 140), a low-pressure passage 142, a pressure control passage 144, and an actuation fluid passage 146. The high-pressure passage 140 and the pressure control passage 144 may both extend generally longitudinally along the longitudinal axis 134, and may be fluidly coupled to each other via a cavity 150 disposed relatively closer to the first end 130 than to the second end 132, as shown. The high-pressure passage 140 may be fluidly coupled to a fluid source 154, and may accordingly receive hydraulic fluid from the fluid source 154 (see direction, A) for an actuation of the fuel injector 100. In some embodiments, the fluid source 154 includes a pressure pump (not shown) that is adapted to pressurize the hydraulic fluid for transit into the high-pressure passage 140.

Further, the body 116 defines an enclosure 160 disposed axially below the cavity 150, and a chamber 162 disposed axially further below the enclosure 160 (according to the orientation of the fuel injector 100 depicted in FIG. 1). The high-pressure passage 140 is coupled to the enclosure 160 via a branch passage 166, while the enclosure 160 is fluidly coupled to the chamber 162 via the actuation fluid passage 146. Furthermore, the body 116 also includes a fuel pressurization chamber 172 disposed further axially below the chamber 162, and into which fuel may be transferred and pressurized for facilitating fuel injection. Additionally, the body 116 includes a nozzle chamber 174 fluidly coupled to the fuel pressurization chamber 172 via a nozzle supply passage 176. The nozzle chamber 174 includes an injection slot 178 that extends all the way to a nozzle outlet 180 of the body 116 disposed at the second end 132, as shown. The body 116 also includes a compartment 168 that is disposed below the fuel pressurization chamber 172, and which may be fluidly coupled to the pressure control passage 144.

For the purposes of the present disclosure, terms such as "upward", "upwards", "downward", and "downwards", as used, are relative to the orientation of the body 116 in FIG. 1. The terms "upward" or "upwards" may mean towards (e.g., in a direction towards) the first end 130 of the body 116, while the terms "downward" or "downwards" may mean towards (e.g., in a direction towards) the second end 132 of the body 116.

The control valve assembly 120 may be positioned at the first end 130 of the body 116, and may include an electrical actuator 190 and a pilot valve member 192. The electrical actuator 190 may include a solenoid that may be energized or de-energized by a controller or an electronic control module (ECM) (not shown) to operate the pilot valve member 192. An operation of the pilot valve member 192 includes a movement of the pilot valve member 192 to an upward position and a downward position relative to the cavity 150. In the upward position of the pilot valve member 192, the pilot valve member 192 may block the high-pressure passage 140 from the low-pressure passage 142 and the pressure control passage 144, while allowing fluid communication between the low-pressure passage 142 and the pressure control passage 144. In the downward position of the pilot valve member 192 (i.e., the configuration shown in FIG. 1), the pilot valve member 192 may allow fluid communication to occur between the high-pressure passage 140 and the pressure control passage 144, while blocking the low-pressure passage 142 from each of the high-pressure passage 140 and the pressure control passage 144. As an example, when the electrical actuator 190 is energized, the pilot valve member 192 is moved to the upward position, and when the electrical actuator 190 is de-energized, the pilot valve member 192 is moved to the downward position. It may be noted that when the electrical actuator 190 is de-energized, the pilot valve member 192 may be biased to the downward position by action of a biasing spring 208.

The spool valve member 122 may be positioned within the enclosure 160, and may be movable upwards and downwards within (or relative to) the enclosure 160. As an example, the spool valve member 122 may be biased to an upward position by the action of a biasing spring 212. Further, the spool valve member 122 may include a head end surface 196 that may receive pressurized hydraulic fluid from the branch passage 166. During operation, pressure may be exerted on the head end surface 196 to push against the action of the biasing spring 212, and facilitate a downward movement of the spool valve member 122 within (or relative to) the enclosure 160. In an embodiment, the downward movement is executed along the longitudinal axis 134 within the enclosure 160.

The piston assembly 124 may include a piston 200, and a plunger 202 coupled (e.g., fixedly coupled) to the piston 200. The piston 200 may be disposed in the chamber 162, while the plunger 202 may extend partly into the fuel pressurization chamber 172, as shown. As with the spool valve member 122, the piston 200 may be configured to execute a back and forth stroke along the longitudinal axis 134 (i.e., upward and downward movement) within (or relative to) the chamber 162, as well. The piston 200 may be biased to an upward position by the action of a biasing spring 218. Since the actuation fluid passage 146 may be fluidly coupled between the enclosure 160 and the chamber 162, the back and forth stroke of the piston 200 may be enabled by controlling a pressure of the hydraulic fluid within the actuation fluid passage 146. As an example, as the piston 200 may execute a back and forth stroke, the plunger 202 may execute a concomitant back and forth stroke within (or relative to) the fuel pressurization chamber 172, as well (since the plunger 202 may be fixedly coupled to the piston 200). Accordingly, a pressure within the fuel pressurization chamber 172 may be controlled by a movement of the piston 200 and the plunger 202.

The needle valve system 126 may include a needle valve member 204 that extends in part into each of the injection slot 178, the nozzle chamber 174, and the compartment 168, as shown. The needle valve member 204 may be biased downwards towards the nozzle outlet 180 to close the nozzle outlet 180 (arranged at the second end 132 of the body 116) by use of a biasing spring 210. As the nozzle chamber 174 is fluidly coupled to the fuel pressurization chamber 172 through the nozzle supply passage 176, the needle valve member 204 may be actuated based on hydraulic fluid pressure acting through the nozzle supply passage 176 (discussed below), and accordingly, may be moved (e.g., reciprocated) to open and close the nozzle outlet 180, facilitating an injection of fuel through the nozzle outlet 180, during a combustion process.

Prior to a fuel injection event into the one or more combustion chambers of an associated internal combustion engine, as the electrical actuator 190 is de-energized, the pilot valve member 192 is held in its downward position (see position in FIG. 1) by a biasing spring 212. For an injection of fuel to occur, the electrical actuator 190 may be energized and the pilot valve member 192 may be moved to the upward position. In the upward position, the high-pressure passage 140 may be blocked away from the pressure control passage 144 and the low-pressure passage 142, as noted above, and thus high-pressure hydraulic fluid may be may be directed through the branch passage 166 towards the spool valve member 122, pushing the spool valve member 122 downwards against the action of the biasing spring 212. The downward movement of the spool valve member 122 causes high-pressure hydraulic fluid in the actuation fluid passage 146 to act against the piston 200, forcing the piston 200 to move downwards against the action of the biasing spring 218. This downward movement results in a corresponding downward movement of the plunger 202, in turn raising a pressure of fuel housed within each of the fuel pressurization chamber 172, the nozzle supply passage 176, and the nozzle chamber 174.

Since in the upward position of the pilot valve member 192, the pressure control passage 144 may be blocked away from the high-pressure passage 140, and, instead, be fluidly coupled to the low-pressure passage 142, low pressure may act on the needle valve member 204 from above (i.e., through the pressure control passage 144 and the compartment 168). Therefore, as and when fuel pressure exerted on the needle valve member 204 from below (i.e., through the nozzle supply passage 176 and the nozzle chamber 174) exceeds a hydraulic fluid pressure from above (i.e., through the pressure control passage 144 and the compartment 168), the needle valve member 204 is lifted against the action of the biasing spring 210 and fuel is allowed to be sprayed from the nozzle chamber 174 into a combustion chamber through the nozzle outlet 180.

It may be noted that the body 116 of the fuel injector 100 may include a variety of other passages, structures, configurations, and specifications, based on an environment in which the fuel injector 100 is applied. The fuel injector 100, in general, may also work on a principle other than what has been discussed above, and it would accordingly be understood that the aforementioned details and working of the fuel injector 100 has been disclosed solely with the intention to attest one possible configuration and working of the fuel injector 100. It will be appreciated that various other fuel injector types, which use hydraulic fluid for actuation, and which have varying configurations and designs may make use of one or more aspects of the present disclosure. Accordingly, the structure and working of the fuel injector 100 need to be viewed as being purely exemplary.

Figure 2:
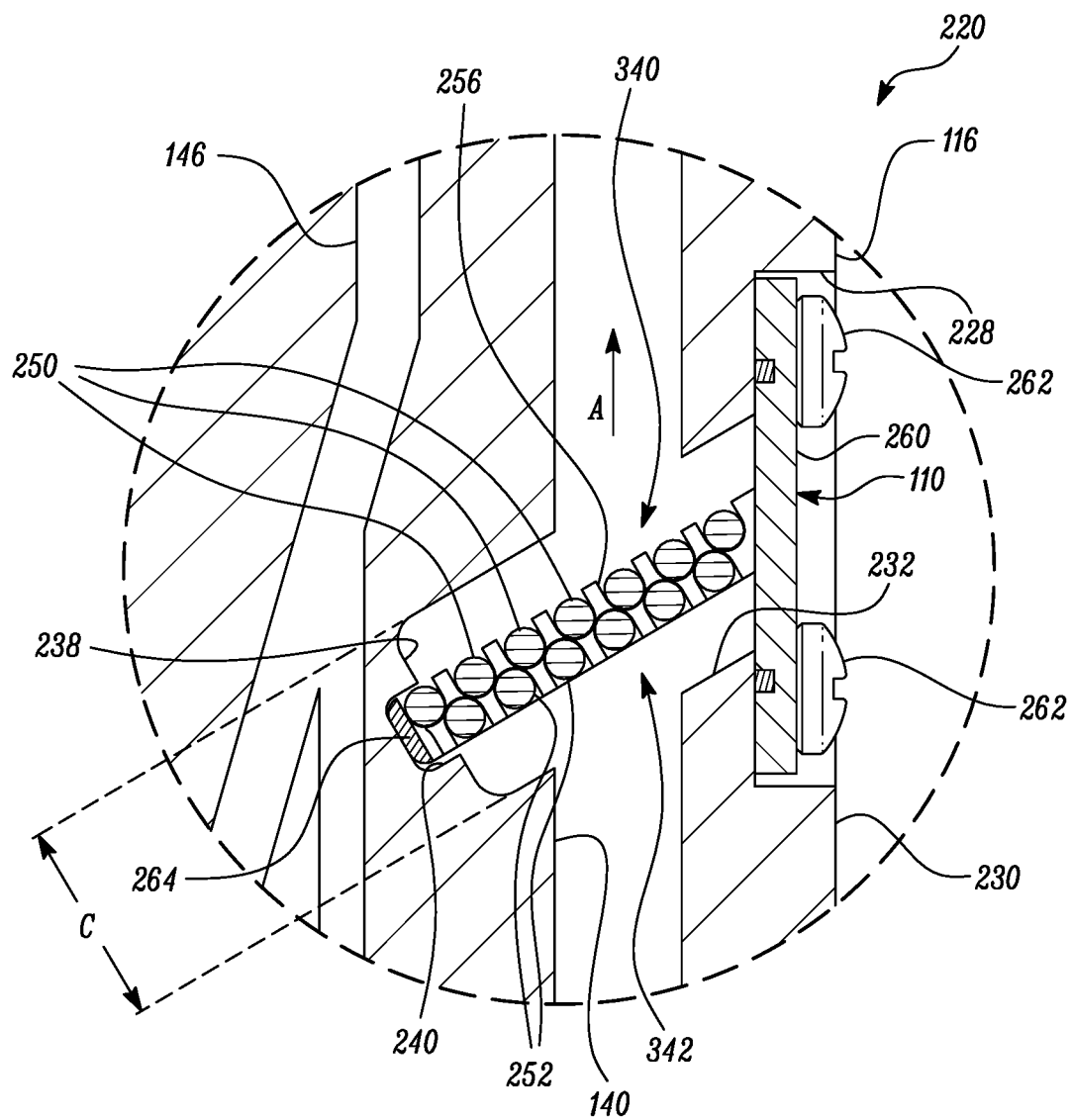
FIG. 2 is an enlarged view of the filter assembly of FIG. 1.

Referring to FIGS. 1 and 2, forthcoming description relates to the filtration of the hydraulic fluid during a flow of the hydraulic fluid through the high-pressure passage 140 and the pressure control passage 144. To this end, the body 116 includes a first filtering section 220 that is configured to accommodate the first filter assembly 110 to filter hydraulic fluid flowing through the high-pressure passage 140, and a second filtering section 222 that is configured to accommodate the second filter assembly 112 to filter hydraulic fluid flowing through the pressure control passage 144.

The first filtering section 220 includes a recess 228 extending inwardly into the body 116 from an exterior surface 230 of the body 116, and a cavity 232 spanning from the recess 228 and extending further into the body 116 generally laterally across the high-pressure passage 140, as shown, up to an end face 238 of the body 116. The cavity 232 may include a width, C (FIG. 2). Further, the first filtering section 220 includes an indentation 240, generally centered on the end face 238, and which extends from the end face 238 further into the body 116, as shown. In some embodiments, the cavity 232 (along with the indentation 240) may be disposed at an incline to the high-pressure passage 140, and said incline may be such that the cavity 232 (along with the indentation 240) may be tilted towards the second end 132 of the body 116.

The second filtering section 222 includes features that are similar to that of the first filtering section 220. To save clarity, therefore, corresponding features of the second filtering section 222, i.e., a recess, a cavity, and an indentation, have not been explicitly annotated or discussed as they are understood to remain similar to the recess 228, the cavity 232, and the indentation 240, of the first filtering section 220. However, it may be noted (and visualized from FIG. 1) that the cavity and the indentation associated with the second filtering section 222 may be tilted towards the first end 130, unlike the tilt of the cavity 232 and the indentation 240 towards the second end 132. For ease, the description further below will generally include discussions directed towards the first filtering section 220 (vis-à-vis the first filter assembly 110). Unless specified otherwise, such description will be equivalently applicable for the second filtering section 222 (vis-à-vis the second filter assembly 112), as well. Moreover, discussions that are directed towards the first filter assembly 110 will be applicable to the second filter assembly 112, as well. Wherever required, explicit references to the second filtering section 222 and the second filter assembly 112 may also be used.

Figure 3:
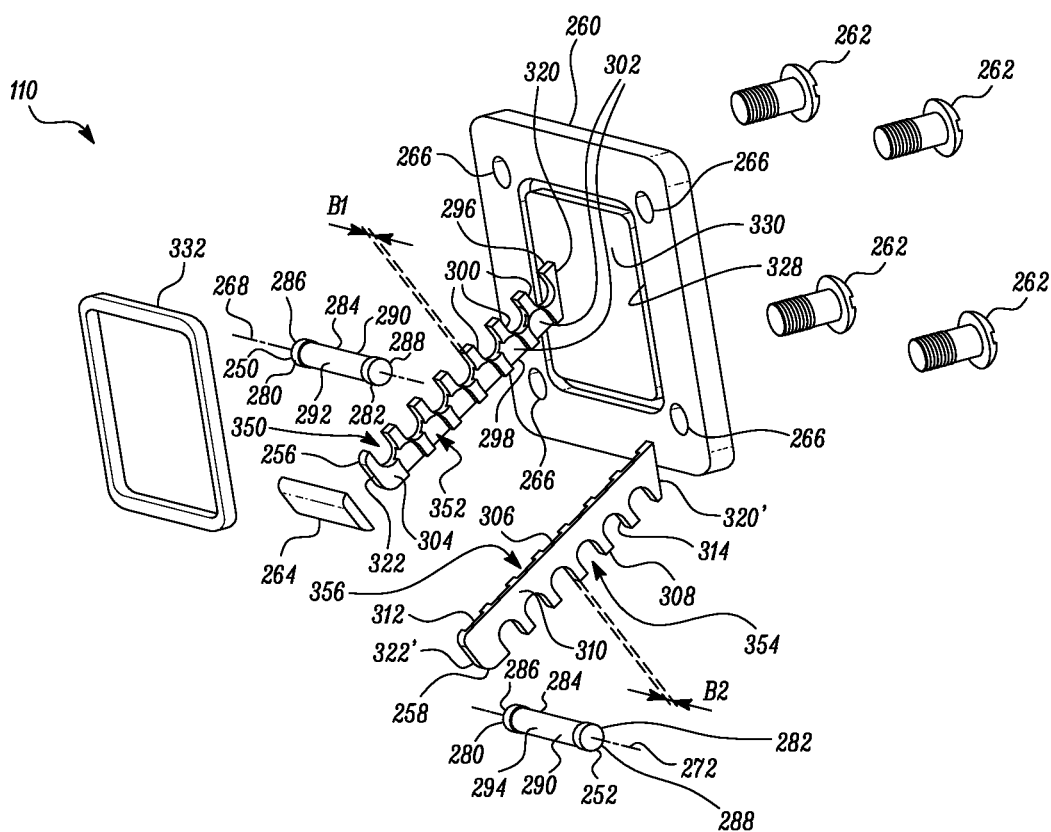
FIG. 3 is an exploded view of the filter assembly, depicting various components of the filter assembly, in accordance with an embodiment of the present disclosure.
Figure 4:
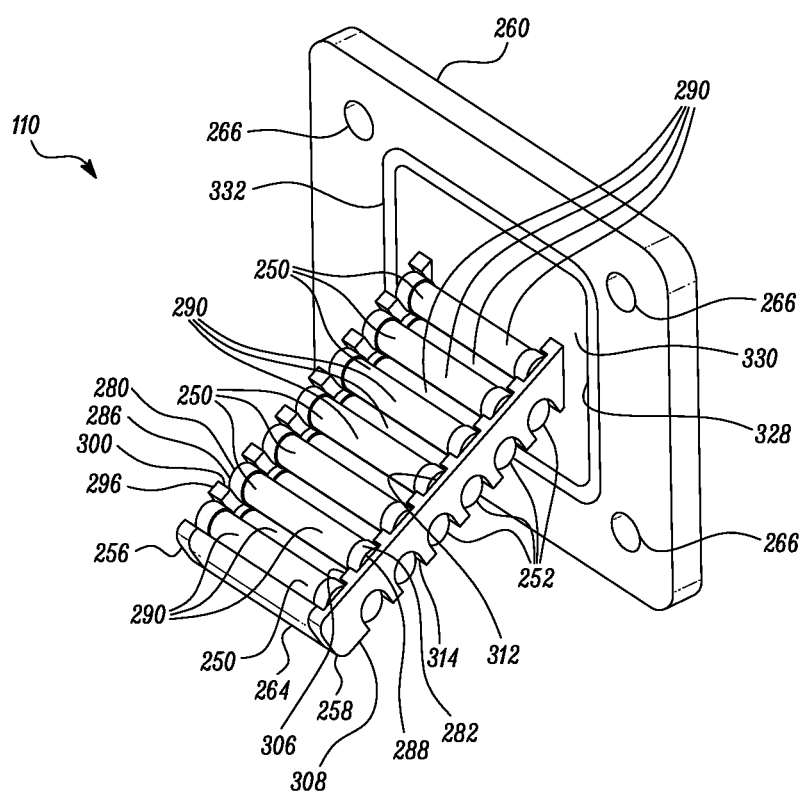
FIG. 4 is an assembled view of the filter assembly, in accordance with an embodiment of the present disclosure.
Figure 5:
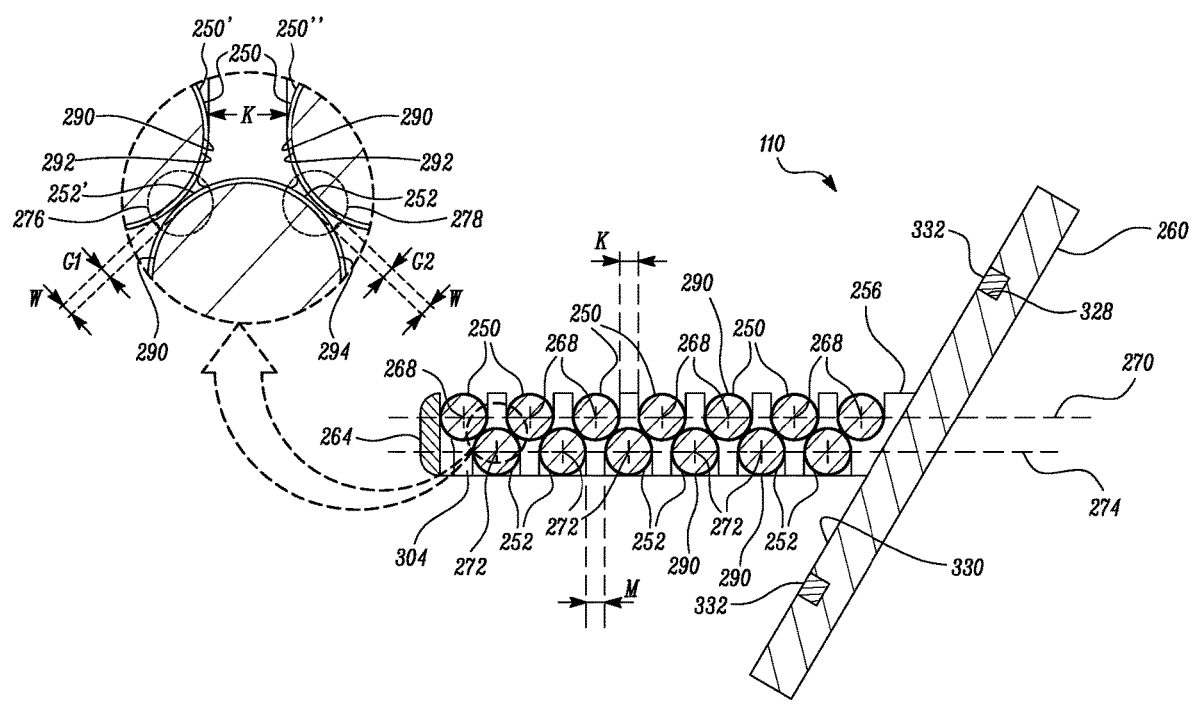
FIG. 5 is a cross-sectional view of the filter assembly, in accordance with an embodiment of the present disclosure.

Referring to FIGS. 3, 4, and 5, the first filter assembly 110 will now be discussed. For simplicity, the first filter assembly 110 may be interchangeably referred to as "filter assembly 110", while the first filtering section 220 may be interchangeably referred to as a "filtering section 220", hereinafter. The filter assembly 110 includes a number of components including a plurality of first rollers 250 and a plurality of second rollers 252 (only one first roller 250 and one second roller 252 has been provided in FIG. 3 to help visualize an environment surrounding the first rollers 250 and second rollers 252). Further, the filter assembly 110 includes a first bracket 256, a second bracket 258, a clamp plate 260, a set of fasteners 262, and an end plate 264.

The first rollers 250 are parallelly disposed one after the other (also see FIGS. 4 and 5), and define first axes 268 disposed in a first plane 270 (best shown in FIG. 5). Similarly, the second rollers 252 are parallelly disposed one after the other (also see FIGS. 4 and 5), and define second axes 272 disposed in a second plane 274 (best shown in FIG. 5). The second plane 274 may be parallel to the first plane 270. It may be noted that each second roller 252 may be disposed between a consecutively arranged pair of first rollers 250. In other words, every consecutively arranged pair of first rollers 250 may have a correspondingly arranged second roller 252 disposed therebetween. In an implementation, each second roller 252 is so arranged or disposed between two consecutively (and correspondingly) arranged first rollers 250 that centers of each second roller 252 and the consecutively (and correspondingly) arranged first rollers 250 form vertices of a triangle (e.g., an equilateral triangle or an isosceles triangle) (best visualized in FIG. 5). Further, every first roller 250 is distanced at a gap, K, with respect to an adjacent first roller 250, and, similarly, every second roller 252 is distanced at a gap, M, with respect to an adjacent second roller 252. In some embodiments, the gap, K, is dimensionally equal to gap, M, (best visualized in FIG. 5).

The first rollers 250 and second rollers 252 are each similarly structured and sized. For example, each first roller 250 and each second roller 252 includes a cylindrical shape, although other shapes, such as a shape with an elliptical cross-section, a polygonal cross-section, etc., may be contemplated. It may be noted that the terms "rollers" or "roller", as used in the present disclosure for one or more of the first rollers 250 and the second rollers 252, are applied because of the generic 'cylindrical shape' or 'rolled shape' that each of the first rollers 250 and the second rollers 252 may possess. Although the term 'roller' is used throughout the specification and claims, the term refers to the general shape of the components, and not to any perceived capability of the components to actually 'roll'. Each first roller 250 and each second roller 252 includes a first disc portion 280, a second disc portion 282, and a central roller portion 284 (FIG. 3) axially extending (i.e., co-axially along the corresponding axis, i.e., the first axis 268 or the second axis 272) between the first disc portion 280 and the second disc portion 282. Moreover, each first roller 250 and each second roller 252 may include a first axial end 286 and a second axial end 288, with the first disc portion 280 being arranged at the first axial end 286 and the second disc portion 282 being arranged at the second axial end 288. It may be noted from FIG. 3 that only one first roller 250 and one second roller 252 are annotated with the references—280, 282, 284, 286, and 288, for clarity and ease of understanding).

Each of the first disc portion 280 and the second disc portion 282 may include a circular shape with a diameter larger than a diameter of the central roller portion 284—although in some cases it is possible for the diameter of the first disc portion 280 and the second disc portion 282 to be smaller than a diameter of the central roller portion 284. In some embodiments, the diameter of the first disc portion 280 is equal to the diameter of the second disc portion 282. In yet some embodiments, a diameter of each of the first disc portion 280, second disc portion 282, and the central roller portion 284 may be the same. Additionally, or optionally, the first disc portion 280, the central roller portion 284, and the second disc portion 282, may be integrally formed. In still some cases, the first disc portion 280 and the second disc portion 282 may include a polygonal (e.g., hexagonal) shape. Further, each first roller 250 and each second roller 252 may define an outer surface 290 (e.g., around the central roller portion 284).

Referring to FIG. 5, for discussing certain aspects of the present disclosure, a consecutively arranged pair of first rollers 250 include and/or are explicitly identified as a first roller 250' and a first roller 250". Furthermore, a second roller 252 disposed in between the first roller 250' and the first roller 250" is identified as second roller 252'. Moreover, for ease in discussing these aspects, the outer surface 290 of each first roller 250 may be explicitly referred to as outer surface 292, while the outer surface 290 of each second roller 252 may be explicitly referred to as outer surface 294. Aspects discussed for this three-roller set (i.e., first rollers 250', 250", and second roller 252') may be applicable for every such set of the filter assembly 110.

In further detail, it may be noted that the outer surface 294 of the second roller 252' shares corresponding interfacing gaps, W, with the outer surface 292 of each of the first roller 250' and the first roller 250". Said interfacing gaps, W, may be categorized as a first interfacing gap, G1, and a second interfacing gap, G2. The first interfacing gap, G1, may be at a location where the outer surface 292 of the first roller 250' is the closest to the outer surface 294 of the second roller 252'. Similarly, the second interfacing gap, G2, may be at a location where the outer surface 292 of the first roller 250" is the closest to the outer surface 294 of the second roller 252'. Both the first interfacing gap, G1, and the second interfacing gap, G2, may define a consistent gap width throughout. In one example, the first interfacing gap, G1, and the second interfacing gap, G2, is equal to (or lesser) than 0.075 millimeters (mm).

A first filtration zone 276 is defined between the outer surface 292 of the first roller 250' and the outer surface 294 of the second roller 252' by first interfacing gap, G1, while a second filtration zone 278 is defined between the outer surface 292 of the first roller 250" and the outer surface 294 of the second roller 252'. Since said aspects may be applicable for every three-roller set (i.e., every successive pair of first rollers 250 and corresponding second rollers 252), a first filtration zone (such as the first filtration zone 276) is defined between the outer surface 290 of each second roller 252 and the outer surface 290 of one first roller 250 of the correspondingly and consecutively arranged pair of first rollers 250, and a second filtration zone (such as the second filtration zone 278) is defined between the outer surface 290 of each second roller 252 and the outer surface 290 of the other first roller 250 of the corresponding and consecutively arranged pair of first rollers 250. In that manner, each second roller 252 defines one or more filtration zones (e.g., the first filtration zone 276 and second filtration zone 278) with the consecutively arranged pair of first rollers 250 for filtering the hydraulic fluid.

The first bracket 256 may support (e.g., by welding) first axial ends 286 (FIG. 3) of each first roller 250 and each second roller 252. The first bracket 256 may include first bracket body 304 with a first boundary edge 296 and a second boundary edge 298 opposite to the first boundary edge 296 (FIG. 3). The first bracket body 304 may define serially arranged first receptacles 300 (only few marked for clarity) along the first boundary edge 296 and serially arranged first pockets 302 (only few marked for clarity) along the second boundary edge 298. The first receptacles 300 each extend from the first boundary edge 296 into the first bracket body 304, and similarly, the first pockets 302 extend from the second boundary edge 298 into the first bracket body 304. The first receptacles 300 may receive and secure (e.g., by welding) each first roller 250 (i.e., the first disc portions 280 arranged at the first axial ends 286 of the first rollers 250), while the first pockets 302 may receive and secure (e.g., by welding) each second roller 252 (i.e., the first disc portions 280 arranged at the first axial ends 286 of the second rollers 252).

The second bracket 258 may support (e.g., by welding) second axial ends 288 (FIG. 3) of each first roller 250 and each second roller 252. The second bracket 258 may include a second bracket body 310 with a first peripheral edge 306 and a second peripheral edge 308 opposite to the first peripheral edge 306 (FIG. 3). The second bracket body 310 may define serially arranged second pockets 312 (only few marked for clarity) along the first peripheral edge 306 and serially arranged second receptacles 314 (only few marked for clarity) along the second peripheral edge 308. The second receptacles 314 each extend from the second peripheral edge 308 into the second bracket body 310, and similarly, the second pockets 312 extend from the first peripheral edge 306 into the second bracket body 310. The second receptacles 314 may receive and secure (e.g., by welding) each second roller 252 (i.e., the second disc portions 282 arranged at the second axial ends 288 of the second rollers 252), while the second pockets 312 may receive and secure (e.g., by welding) each first roller 250 (i.e., the second disc portions 282 arranged at the second axial ends 288 of the first rollers 250).

It may be noted that the first receptacles 300 extend throughout and across a width, B1, of the first bracket 256. Similarly, the second receptacles 314 extend throughout and across a width, B2, of the second bracket 258. The first pockets 302, however, extend only partly through the width, B1, of the first bracket 256, as shown. Similarly, the second pockets 312 extend only partly through the width, B2, of the second bracket 258. Further, although not limited, each of the first receptacles 300, second receptacles 314, first pockets 302, and the second pockets 312, may be generally U-shaped.

In an embodiment, the first receptacles 300 define respective mouths 350 (only few annotated) and the first pockets 302 define respective openings 352 (only few annotated). As shown, the mouths 350 are directed away from the openings 352. Similarly, the second receptacles 314 define respective mouths 354 (only few annotated) and the second pockets 312 define respective openings 356 (only few annotated). As shown, the mouths 354 are directed away from the openings 356. In an assembled state of the filter assembly 110, it may be noted that a profile (e.g., a U-shaped profile) of the first receptacles 300 may be aligned with a profile (e.g., a U-shaped profile) of the second pockets 312. Similarly, a profile (e.g., a U-shaped profile) of the first pockets 302 may be aligned with a profile (e.g., a U-shaped profile) of the second receptacles 314. Moreover, the first bracket 256 may be disposed parallelly to the second bracket 258. In so doing, the first bracket 256 and the second bracket 258 facilitate the parallel arrangement and assembly of the first rollers 250 with respect to the second rollers 252.

The end plate 264 and the clamp plate 260 may be coupled to the first bracket 256 and the second bracket 258. For example, the first bracket 256 and the second bracket 258 may respectively define first bracket ends 320, 320', and the clamp plate 260 may be coupled (e.g., by welding) to said first bracket ends 320, 320'. Similarly, the first bracket 256 and the second bracket 258 may define second bracket ends 322, 322' (remote/opposite to the first bracket ends 320, 320'), and the end plate 264 may be coupled (e.g., by welding) to said second bracket ends 322, 322'.

The clamp plate 260 is configured to be disposed, at least partly, into the recess 228 and coupled to the body 116 of the fuel injector 100 by use of the set of fasteners 262. As an example, the clamp plate 260 includes fastening holes 266 (FIGS. 3 and 4) that may be aligned to a set of corresponding openings (not shown) formed in the body 116. The set of fasteners 262 may be driven (i.e., inserted) through the fastening holes 266 and the corresponding openings in the body 116 to secure the clamp plate 260 to the body 116 (within the recess 228). The set of fasteners 262 may include threaded fasteners, such as screws, bolts, studs, and the like, and may be four in number, as exemplarily shown, although this number may change depending upon spatial considerations, etc. Further, it may be noted that the clamp plate 260 may be disposed at an inclination to the first plane 270 and the second plane 274—i.e., the clamp plate 260 is disposed at an equal inclination to each of the first bracket 256 and the second bracket 258. To this end, the first bracket ends 320, 320' may be slanted or angled respectively in relation to the first boundary edge 296 and the first peripheral edge 306, as shown. Further, the clamp plate 260 may define a slot 328 cut around a portion 330 to which the first bracket 256 and the second bracket 258 may be coupled to. The filter assembly 110 may include a seal 332 that may be seated within the slot 328.

INDUSTRIAL APPLICABILITY

During an assembly of the filter assembly 110 into the filtering section 220, an operator may first insert the filter assembly 110 into the recess 228, with the end plate 264 entering the recess 228 first. As the operator may push the filter assembly 110 further into the filtering section 220, the end plate 264 may move into the cavity 232 extending from the recess 228. A continued push to the filter assembly 110 causes the end plate 264 of the filter assembly 110 to move across a length of the cavity 232, reach to the end face 238, and eventually fall into the indentation 240, so as to be seated within the indentation 240, as shown in FIG. 2. In that manner the filter assembly 110 is seated and accommodated within the filtering section 220. In some embodiments, a deformable member (not shown) may be sandwiched in between the end plate 264 and the indentation 240 to seal an interface between the end plate 264 and the indentation 240 from hydraulic fluid leakage.

At this stage, the clamp plate 260 may be received and seated within the recess 228, and fastening holes 266 of the clamp plate 260 may be aligned with the corresponding openings formed in the recess 228. The set of fasteners 262, thereafter, may be driven through the fastening holes 266 of the clamp plate 260 and the corresponding openings of the recess 228 to secure the clamp plate 260 within the recess 228. The seal 332 seated within the slot 328 of the clamp plate 260 seals the interface formed between the clamp plate 260 and the recess 228, disallowing hydraulic fluid to flow/leak past said interface. In that manner, the filter assembly 110 is positioned (at least partly) within the high-pressure passage 140 to filter the hydraulic fluid flowing therethrough. Because the cavity 232 (along with the indentation 240) may be tilted towards the second end 132 of the body 116, it may be noted that an assembly of the first rollers 250, second rollers 252, first bracket 256, and second bracket 258, along with the first plane 270 and the second plane 274, may also be tilted towards the second end 132 of the body 116.

With the filter assembly 110 positioned within the filtering section 220 of the body 116, the first rollers 250 and second rollers 252 may take a position generally midway to the width, C, of the cavity 232, defining voids upstream and downstream to the filter assembly 110, as shown. The body 116 defines these voids as oil galleries. More particularly, the body 116 defines a first oil gallery 340 downstream to the filter assembly 110, and a second oil gallery 342 upstream to the filter assembly 110, with respect to the direction (i.e., direction, A) of hydraulic fluid flow during filtration. In an embodiment, the first oil gallery 340 and the second oil gallery 342 are defined within the cavity 232.

During operation, as hydraulic fluid may pass from the fluid source 154 into the high-pressure passage 140 via the fluid line 156, and move along direction, A, the hydraulic fluid first enters the second oil gallery 342. Thereafter, the first filter assembly 110 receives the hydraulic fluid and filters the hydraulic fluid before allowing further passage to the hydraulic fluid towards the cavity 150. During filtration, the hydraulic fluid first enters into the gaps, M, (FIG. 5) defined by the second rollers 252. Thereafter, the hydraulic fluid flows along the outer surface 290 of the second rollers 252, and enters into the gaps (such as first interfacing gap, G1, and the second interfacing gap, G2) formed respectively between the second rollers 252 and the first rollers 250. As the hydraulic fluid passes through the interfacing gaps, G1, and G2, constituents or particles having a size or dimension larger than the gaps, G1, and G2, may be restricted from further travel along direction, A, and, accordingly, the hydraulic fluid may be filtered. Once the hydraulic fluid is filtered, a filtered volume of hydraulic fluid passes through the gaps, K, and moves into the first oil gallery 340 before executing further travel along direction, A. In that manner, hydraulic fluid flowing within the high-pressure passage 140 is filtered. A similar filtering sequence and operation may be contemplated for the second filter assembly 112, positioned within the second filtering section 222, as well.

An assembling of the second filter assembly 112 with the second filtering section 222 may remain similar to the assembling of the first filter assembly 110 with the first filtering section 220. However, since the cavity and the indentation associated with the second filtering section 222 may be tilted towards the first end 130 of the body 116, in an assembly of the second filter assembly 112 with the second filtering section 222, an assembly of the first rollers, second rollers, first bracket, and second bracket, of the second filter assembly 112, along with the corresponding first plane and the second plane, may be tilted towards the first end 130 of the body 116, as well. Moreover, oil galleries, similar to the first oil gallery 340 and the second oil gallery 342, may be defined with respect to the second filter assembly 112, as well.

It may be noted that the flow direction (i.e., direction, A) as aforementioned may change in certain circumstances, and thus the direction, A, as illustrated, need to be considered as exemplary. Accordingly, it will be appreciated that the filter assembly 110 is also capable of filtering hydraulic fluid travelling in reverse direction (i.e., in a direction opposite to direction, A, from gap, K, to gap, M), as well.

If the filter assembly 110 were required to be cleaned/rinsed after a period of use, the set of fasteners 262 may be unscrewed, and, thereafter, the clamp plate 260, along with the remainder of the filter assembly 110, may be removed from the filtering section 220. Once a rinsing and/or a cleaning procedure of the filter assembly 110 is complete, the filter assembly 110 may be secured back into the filtering section 220 according to the process described above. Optionally, the filter assembly 110 may also be used at a first start of an (associated) engine after a service operation on the engine has ended, so as to filter out leftover debris present in a hydraulic fluid flow. Once the hydraulic fluid flow is cleared up from debris, the filter assembly 110 may be removed. It may be understood from the aforementioned description that the filter assembly 110 provides for a more modular and convenient means to filter the hydraulic fluid, while also helping prolong a life of the fuel injector 100.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A filter assembly for filtering hydraulic fluid in a hydraulically actuated fuel injector, the filter assembly comprising:
   a plurality of first rollers parallelly disposed one after the other, and defining first axes disposed in a first plane; and
   a plurality of second rollers parallelly disposed one after the other, and defining second axes disposed in a second plane parallel to the first plane, each second roller of the plurality of second rollers being disposed between a consecutively arranged pair of first rollers of the plurality of first rollers to define one or more filtration zones for filtering the hydraulic fluid.

2. The filter assembly of claim 1, wherein each first roller of the plurality of first rollers and each second roller of the plurality of second rollers includes:
   a first disc portion, a second disc portion, and a central roller portion axially extending therebetween, each of the first disc portion and the second disc portion including a diameter larger than a diameter of the central roller portion.

3. The filter assembly of claim 1, wherein each first roller of the plurality of first rollers and each second roller of the plurality of second rollers define an outer surface, wherein
   a first filtration zone is defined between the outer surface of each second roller and the outer surface of one first roller of the consecutively arranged pair of first rollers, and
   a second filtration zone is defined between the outer surface of each second roller and the outer surface of the other first roller of the consecutively arranged pair of first rollers.

4. The filter assembly of claim 1, wherein each first roller of the plurality of first rollers and each second roller of the plurality of second rollers define a first axial end and a second axial end, the filter assembly further including:
   a first bracket to support first axial ends of each first roller and each second roller, and
   a second bracket to support second axial ends of each first roller and each second roller.

5. The filter assembly of claim 4, wherein the first bracket includes a first boundary edge and a second boundary edge, and serially arranged first receptacles along the first boundary edge and serially arranged first pockets along the second boundary edge, the serially arranged first receptacles receiving each first roller, while the serially arranged first pockets receiving each second roller.

6. The filter assembly of claim 4, wherein the second bracket includes a first peripheral edge and a second peripheral edge, and serially arranged second pockets along the first peripheral edge and serially arranged second receptacles along the second peripheral edge, the serially arranged second receptacles receiving each second roller, while the serially arranged second pockets receiving each first roller.

7. The filter assembly of claim 4 further including a clamp plate coupled to the first bracket and the second bracket, the clamp plate configured to be coupled to a body of the hydraulically actuated fuel injector.

8. The filter assembly of claim 7, wherein the first plane and the second plane is disposed at an inclination to the clamp plate.

9. The filter assembly of claim 4 further including an end plate coupled to the first bracket and the second bracket.

10. A fuel injector, comprising:
    a body with a channel to receive hydraulic fluid for actuating the fuel injector; and
    a filter assembly at least partly positioned within the channel to filter the hydraulic fluid, the filter assembly including:
       a plurality of first rollers parallelly disposed one after the other, and defining first axes disposed in a first plane; and
       a plurality of second rollers parallelly disposed one after the other, and defining second axes disposed in a second plane parallel to the first plane, each second roller of the plurality of second rollers being disposed between a consecutively arranged pair of first rollers of the plurality of first rollers to define one or more filtration zones for filtering the hydraulic fluid.

11. The fuel injector of claim 10, wherein each first roller of the plurality of first rollers and each second roller of the plurality of second rollers includes:
    a first disc portion, a second disc portion, and a central roller portion axially extending therebetween, each of the first disc portion and the second disc portion including a diameter larger than a diameter of the central roller portion.

12. The fuel injector of claim 10, wherein each first roller of the plurality of first rollers and each second roller of the plurality of second rollers define an outer surface, wherein
    a first filtration zone is defined between the outer surface of each second roller and the outer surface of one first roller of the consecutively arranged pair of first rollers, and a second filtration zone is defined between the outer surface of each second roller and the outer surface of the other first roller of the consecutively arranged pair of first rollers.

13. The fuel injector of claim 10, wherein the first plane and the second plane are tilted relative to the channel.

14. The fuel injector of claim 10, wherein the body defines:
   a first oil gallery downstream to the filter assembly, and a second oil gallery upstream to the filter assembly, with respect to a direction of hydraulic fluid flow during filtration.

15. The fuel injector of claim 10, wherein each first roller of the plurality of first rollers and each second roller of the plurality of second rollers define a first axial end and a second axial end, the filter assembly further including:
   a first bracket to support first axial ends of each first roller and each second roller, and
   a second bracket to support second axial ends of each first roller and each second roller.

16. The fuel injector of claim 15, wherein the first bracket includes a first boundary edge and a second boundary edge, and serially arranged first receptacles along the first boundary edge and serially arranged first pockets along the second boundary edge, the serially arranged first receptacles receiving each first roller, while the serially arranged first pockets receiving each second roller.

17. The fuel injector of claim 15, wherein the second bracket includes a first peripheral edge and a second peripheral edge, and serially arranged second pockets along the first peripheral edge and serially arranged second receptacles along the second peripheral edge, the serially arranged second receptacles receiving each second roller, while the serially arranged second pockets receiving each first roller.

18. The fuel injector of claim 15, wherein the filter assembly includes a clamp plate coupled to the first bracket and the second bracket, and coupled to the body.

19. The fuel injector of claim 18, wherein the first plane and the second plane is disposed at an inclination to the clamp plate.

20. The fuel injector of claim 15, wherein the filter assembly includes an end plate coupled to the first bracket and the second bracket.

* * * * *